United States Patent
Chan et al.

(10) Patent No.: US 9,088,916 B2
(45) Date of Patent: Jul. 21, 2015

(54) METHOD TO ENABLE SINGLE RADIO HANDOVER

(75) Inventors: Hinghung Anthony Chan, Plano, TX (US); James Prescott Hughes, Palo Alto, CA (US)

(73) Assignee: Futurwei Technologies, Inc., Plano, TX (US)

( * ) Notice: Subject to any disclaimer, the term of this patent is extended or adjusted under 35 U.S.C. 154(b) by 364 days.

(21) Appl. No.: 13/284,585

(22) Filed: Oct. 28, 2011

(65) Prior Publication Data

US 2012/0108277 A1 May 3, 2012

Related U.S. Application Data

(60) Provisional application No. 61/408,361, filed on Oct. 29, 2010.

(51) Int. Cl.
*H04W 36/00* (2009.01)
*H04W 36/14* (2009.01)
*H04W 36/18* (2009.01)

(52) U.S. Cl.
CPC .......... *H04W 36/0011* (2013.01); *H04W 36/14* (2013.01); *H04W 36/18* (2013.01)

(58) Field of Classification Search
CPC .... H04B 1/1027; H04W 48/20; H04W 36/30; H04W 24/00; H04W 88/08; H04W 36/18; H04W 28/04; H04W 80/04; H04W 84/12
USPC ......... 455/501, 525, 436, 424, 437, 524, 442; 370/332, 333, 331, 338, 329
See application file for complete search history.

(56) References Cited

U.S. PATENT DOCUMENTS

| | | | |
|---|---|---|---|
| 7,468,638 B1 * | 12/2008 | Tsai et al. | 331/126 |
| 2001/0008521 A1 * | 7/2001 | Virtanen | 370/331 |
| 2005/0032492 A1 * | 2/2005 | Asayama et al. | 455/150.1 |
| 2005/0073977 A1 * | 4/2005 | Vanghi et al. | 370/335 |
| 2009/0143069 A1 * | 6/2009 | Nystrom et al. | 455/442 |
| 2009/0186616 A1 * | 7/2009 | Kim et al. | 455/436 |
| 2009/0290556 A1 * | 11/2009 | Taaghol | 370/331 |
| 2010/0054207 A1 * | 3/2010 | Gupta et al. | 370/331 |
| 2010/0098135 A1 * | 4/2010 | Eitan | 375/141 |
| 2012/0177003 A1 | 7/2012 | Chan et al. | |

OTHER PUBLICATIONS

"Cognitive Radio," Wikipedia, http://en.wikipedia.org/wiki/Cognitive_radio, Oct. 27, 2011, 7 pages.

* cited by examiner

*Primary Examiner* — Charles Appiah
*Assistant Examiner* — Alexander Yi
(74) *Attorney, Agent, or Firm* — Conley Rose, P.C.; Grant Rodolph; William H. Dietrich

(57) ABSTRACT

A mobile device comprising a transmitter and a receiver used to wirelessly communicate with at least one network, wherein the mobile device is configured to wirelessly communicate with a first network and a second network, wherein the mobile device is configured to communicate with the second network during a handover procedure from the first network to the second network without disconnecting a link with the first network, and wherein the mobile device is configured to communicate with the second network during communication gaps between the mobile device and the first network during the handover procedure.

27 Claims, 6 Drawing Sheets

METHOD TO ENABLE SINGLE RADIO HANDOVER

CROSS-REFERENCE TO RELATED APPLICATIONS

The present application claims priority to U.S. Provisional Patent Application 61/408,361, filed Oct. 29, 2010 by H. Anthony Chan and entitled "Method to Enable Single Radio Handover," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A single radio handover has been defined in the Worldwide Interoperability for Microwave Access (WiMAX) Forum. The single radio handover is also being introduced in Third Generation Partnership Project (3GPP) group and the Institute for Electrical and Electronic Engineers (IEEE) 802.21c Task Group. In the single radio handover, a multi-radio mobile node (MN) or mobile device can transmit on only one radio at a time. As such, the peak power transmission needed in the mobile device to establish the handover from a source radio (connected to a first network) to a target radio (connected to a second network) is reduced in comparison to a dual radio handover scheme that uses two radios simultaneously. Further, using a single radio may reduce or eliminate substantial interference between the transmitter and receiver, which simplifies the design of the signal radio filter, e.g., for the radio receiver. Reducing the peak power transmission and simplifying the radio filter design for the mobile device also contribute to reducing system cost. Such a lower cost design is appealing to the consumer market, which is experiencing the proliferation of multiple radio interface devices using different network technologies.

SUMMARY

In one embodiment, the disclosure includes a mobile device comprising a transmitter and a receiver used to wirelessly communicate with at least one network, wherein the mobile device is configured to wirelessly communicate with a first network and a second network, wherein the mobile device is configured to communicate with the second network during a handover procedure from the first network to the second network without disconnecting a link with the first network, and wherein the mobile device is configured to communicate with the second network during communication gaps between the mobile device and the first network during the handover procedure.

In another embodiment, the disclosure includes a method comprising performing a single radio handover of a MN from a source network to a target network, wherein a link configuration during handover between the MN and the source network is such that a source radio interface in the MN remains connected to a source point of attachment (POA) in the source network, and wherein a link configuration during handover between the MN and target network is such that communications between the MN and the target network meet the following constraints while the source radio is transmitting, a target radio in the MN cannot transmit.

In another embodiment, the disclosure includes a mobile device comprising a source radio configured to wirelessly communicate with a source network, and a target radio configured to wirelessly communicate with a target network, wherein the mobile device is configured to determine whether the source radio is receiving signals from the source network during a handover from the source network to the target network, and transmit signals from the target radio to the target network during the handover if the source radio is not receiving signals from the source network.

In yet another embodiment, the disclosure includes a mobile device comprising a source radio configured to wirelessly communicate with a source network, and a target radio configured to wirelessly communicate with a target network, wherein the mobile device is configured to determine whether the source radio is transmitting signals to the source network during a handover from the source network to the target network, and receive signals from the target network at the target radio during the handover if the source radio is not transmitting signals to the source network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
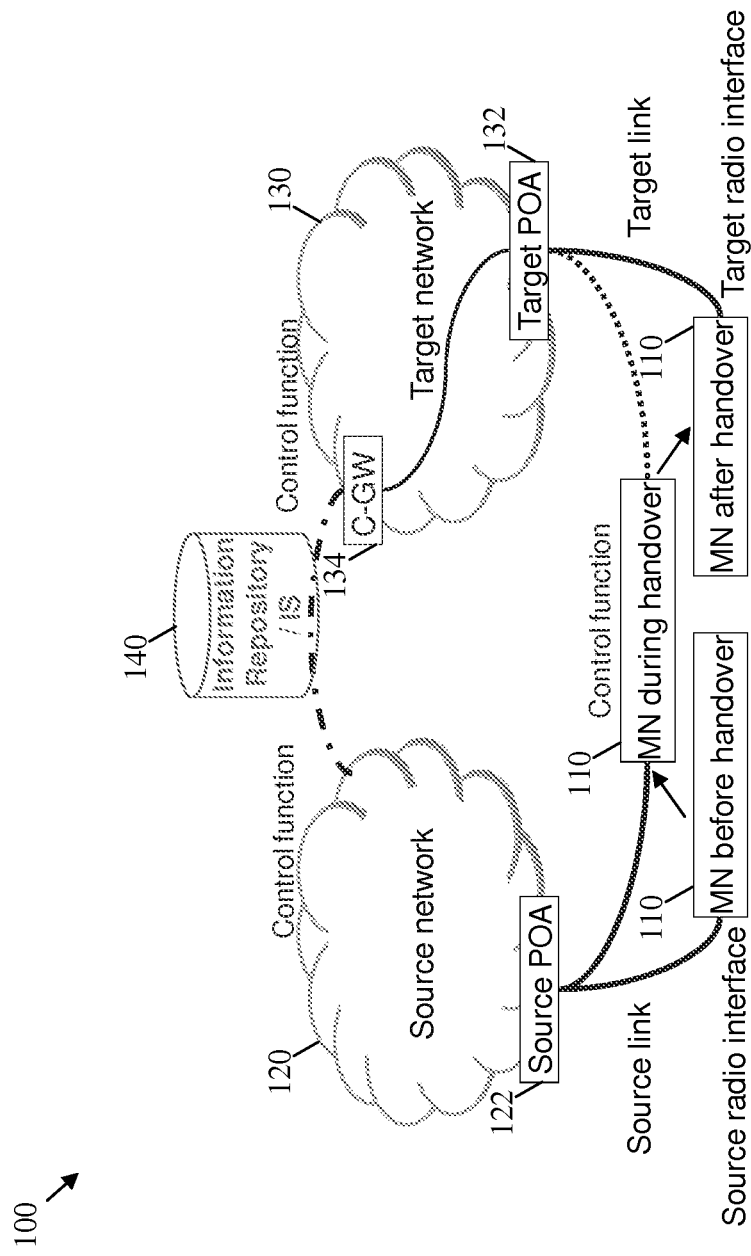
FIG. 1 is a schematic diagram of an embodiment of a make-before-break single radio handover scheme.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In currently proposed single radio handover schemes, a "break-before-make" handover from a first or source network to a second or target network is implemented. In the break-before-make handover, a source radio may be disconnected from the source network before a target radio is connected to the target network. Compared with the dual radio handover scheme, this break-before-make single radio handover may take a longer time to complete the target radio's connection to the target network, which may not be desired.

To reduce the delay in the single radio handover, the target radio may be kept turned off during a handover preparation time and may then be turned on after the source radio is disconnected. As such, some of the handover preparation may be completed prior to turning the target radio on to reduce the handover delay. However, some handover processes may still need to be completed using the target radio, e.g., after turning the target radio on. For example, even if the target network parameters are obtained via the source radio link, the radio channel behaviors may be relatively highly dynamic and may be frequency dependent. In this case, the target radio may still need to set up the target radio link(s) (uplink/downlink) using the actual channel conditions that the target radio may experience (on the target radio links). This scheme is still a break-before-make single radio handover scheme, where the connection or link(s) between the target radio and the target network may be established after the source radio connection with the source network are torn down.

Disclosed herein is a system and methods that explore opportunities that may be available for the target radio to transmit and receive signals in a single radio handover scenario. The transmit and receive opportunities may correspond to conditions or criteria where activating the target radio transmitter and/or receiver while the source radio transmitter/receiver are still active may be tolerated. A plurality of functions may be implemented to enable a MN or mobile device to exploit the transmitting and receiving opportunities for exchanging signals with the target network, and thus establishing a connection with the target network with reduced delay. Additionally, a switch comprising a single transmission power amplifier between the source and the target radio transmitter circuits may be implemented to switch fast enough between the transmitter circuits and allow the target radio to exploit the opportunities. By exploiting the opportunities during the active time of the source radio, the target radio may accomplish more tasks to set up the target radio connection, e.g., before the source radio connection is torn down. Thus, this make-before-break scheme may reduce the handover delay time.

In order words, the target link is made with the target radio as a secondary user while the source link with the source radio as the primary user has not been torn down. The mobile node with both source radio as primary user and target radio as secondary user is still operating in a manner to preserve the benefits of single radio operation. Here the source link has the primary right to use radio resources: it is still fully active and has preemptive right over the target link. The target link only has the secondary right to use the radio resources: it may communicate with the target network only in a manner that is not disruptive for the source radio to transmit or to receive whenever the source radio needs to do so. The target link is functional and only lacks a designation as the primary link to have the primary rights. When the source link is torn down, the target link will immediately become the primary user.

FIG. 1 illustrates an embodiment of a make-before-break single radio handover scheme 100. In the make-before-break single radio handover scheme 100, a mobile device 110 may implement a handover from a source network 120 to a target network 130. The mobile device 110 may be any mobile device configured to communicate wirelessly, e.g., via wireless links or connections, with different networks, which may be based on different wireless technologies. The mobile device 110 may comprise a single radio (not shown) comprising a first transmitter and a first receiver to communicate with the source network 120 and the target network 130. Alternatively, the mobile device 110 may comprise a source radio (not shown) comprising a first transmitter and a first receiver to communicate with the source network 120 and a target radio (not shown) comprising a second transmitter and a second receiver to communicate with the target network 130. Examples of the mobile device 110 may include laptops, smartphones (or mobile phones), tablet computers (also referred to as pads), electronic book (ebook) devices, wireless music devices (e.g., an IPOD) and other communications devices that may communicate wirelessly to exchange data with wireless networks.

The source network 120 and the target network 130 may be any networks equipped with wireless capability and configured to communicate with the mobile device 110 via a wireless link or connection. The source network 120 and the target network 130 may be based on similar or different wireless network technologies. For instance, the source network 120 and the target network 130 may include cellular networks (e.g., code division multiple access (CDMA), Global System for Mobile Communications (GSM), 3GPP, Fourth Generation Partnership Project (4GPP), or other cellular technology networks), WiMAX networks, IEEE 802.11 standards networks (also referred to as Wireless Fidelity or WIFI networks), other wireless technology networks, or combinations thereof. The source network 120 and the target network 130 may comprise a source POA 122 and a target POA 132, respectively. The source POA 122 and the target POA 132 may be access or communication nodes that are configured to establish communications with the mobile device 110. For instance, the source POA 122 and the target POA 132 may comprise radio towers (e.g., base stations), radio frequency (RF) transceivers, infrared transceivers, any other wireless communication systems, or combinations thereof.

In the case of using a single radio, the mobile device 110 may use communications gaps between the single radio and the source network 120 (in transmission and/or reception) during the handover to communicate with the target network 130. Alternatively, in this case of using two radios, the mobile device 110 may use communications gaps between the single radio and the source network 120 (in transmission and/or reception) during the handover to establish communications (in transmission and/or reception) between the target radio and the target network 130. The details and aspects of this make-before-break single radio handover scheme 100 are described further below.

Before the handover, the mobile device 110 may be connected to and exchange data with the source network 120 via the source POA 122. At this point, the mobile device 110 may not be connected to the target network 130. After the handover procedure, the mobile device 110 may be connected to and exchange data with the target network 130 via the target POA 132. At this point, the mobile device 110 may not be connected to the source network 120. For the case of using two radios during the handover, the mobile device 110 may communicate with the source network 120 via the mobile device's source radio and the target network 130 via the mobile device's target radio (in a make-before-break scheme). The mobile device 110 may use both source and target radios at about the same time if some transmitting/receiving opportunities become available. During the handover, the mobile device 110 may also exchange signaling messages with the target network 130 via the link with the source network 120 and a suitable communication mechanism between the source network 120 and the target network 130. A similar scheme may be implemented during the handover in the case of using a single radio in the mobile device 110, where the transmitter and receiver may communicate with the source network 120 or the target network 130 based on the transmitting/receiving opportunities.

The source network 120 and the target network 130 may communicate with each other via an information server 140 and a control plane gateway (C-GW) 134 at the target network 130. The information server 140 may be any network server configured to store necessary information about the mobile device 110 to allow the source network 120 and the target network 130 to complete the handover procedure. This may reduce the handover delay time since exchanging handover related information between the mobile device 110 and the target network 130 via the source network 120 may allow the mobile device 110 to exchange less information using the target radio with the target network 130 to complete the handover. For instance, the information server 140 may be an information repository or information system (IS), which may be located in the source network 120 or the target network 130 and may be accessible from both networks. When the information server 140 is located in one network, the communication mechanism may allow the other network to push and pull information to/from the information server 140. The information server 140 may comprise network information needed to make handover decision, such as the availability of a candidate target network. In one embodiment, the information server 140 may be a media independent information server that comprises information expressed in media independent format.

During the handover, the mobile device 110 may transmit signals to the target network 130 via the mobile device's target radio before disconnecting from the source network if the handover control function detects the availability of transmitting opportunities for the target radio without turning off the source radio. The mobile device 110 may also receive signals from the target network 130 via the mobile device's target radio before disconnecting from the source network (in a make-before-break scheme) if a handover control function of the mobile device 110 detects the availability of receiving opportunities for the target radio without turning off the source radio. The handover control function and transmitting/receiving opportunities for the target radio are described in detail further below.

The handover implementation may comprise a plurality of steps or stages. For instance, in a questioning stage, the mobile device 110 may determine whether a handover is needed, whether a candidate target network 130 is available to switch to (from the source network 120), and whether there is a benefit to switch to the target network 130. This stage may be followed by a handover decision stage, pre-authentication with the target network 130, and preparation for connection with the target network 130. The preparation stage may comprise target radio ranging to search for available radio channels and pre-configuration of the target link with the target network 130. The mobile device 110 may then disconnect the source link with the source network 120 and complete the connection with the target network 130. After the handover is completed, packets that are intended for the mobile device 110 and delivered to the source network 120 may be forwarded or tunneled to the target network 130.

In one scenario, the mobile device 110 may use the source network 120 connection to query the information server 140 about candidate target networks. The mobile device 110 or the source network 120 may then make a handover decision. The mobile device 110 may then go through pre-authentication with the target network 130, e.g., via the communication mechanism between the source network 120 and the target network 130 or using the target radio if the transmitting/receiving opportunities are confirmed. The mobile device 110 may obtain network parameters to enable faster establishment of the target link. The target radio may exploit the transmitting and receiving opportunities described below to set up an uplink and/or a downlink with the target network 130.

After the handover signaling is completed and the target link is established, the target link may be ready to operate but the source link may have priority to pre-empt the target link. Any ongoing Internet Protocol (IP) session (or other ongoing packet session) may be transferred from the source link to the target link, while the source link may still be active. Any packets that are on their way to the source link may still be received by the source link, but no future packets may be delivered to the source link. When no more packets are delivered to the source link, the source link may be disconnected. Since the source link may not get new packets, there may be no need to establish a tunnel from the source network 120 to the target network 130 to forward to the target network 130 the packets already sent to the source network 120. By disconnecting the source link, there may be no more source links with higher priority to pre-empt the target link, which may be the only remaining link. Thus, the new packets may be sent to the target link, and the handover is completed.

During the handover, one of the transmitting opportunities for using the target radio may be using the target radio transmitter during transmission gaps in the source radio and avoiding using both the source radio transmitter and the target radio transmitter simultaneously or at about the same time. Avoiding the simultaneous transmission using both radios may avoid substantially high peak power transmission consumption in the mobile device. Typically, the peak power consumption of the radio transmitter may be substantially high in comparison to the remaining radio components (e.g., the radio receiver). Thus, limiting the transmissions in the source and target radios to using one transmitter at a time may limit the peak power transmission consumption in the mobile device.

However, turning the radio transmitter on and off instantaneously (e.g., with no or substantially reduced response delay) to use the radio transmitter during relatively short transmission gaps may be difficult. Typically, the transmitter may comprise a power amplifier (at a later stage), which may consume more power and may be slower to turn on and off than the remaining transmitter components (at an earlier stage). In an embodiment, to allow the target radio to transmit during relatively or substantially short transmission gaps in the source radio (during handover), a power amplifier may be shared between the source radio and the target radio and may be switched at a sufficient or suitable speed between the two radios. Thus, enabling or disabling the target radio transmitter may depend on the speed of the switching mechanism used for the power amplifier, which may be substantially faster than the speed of turning the transmitter on and off.

Figure 2:
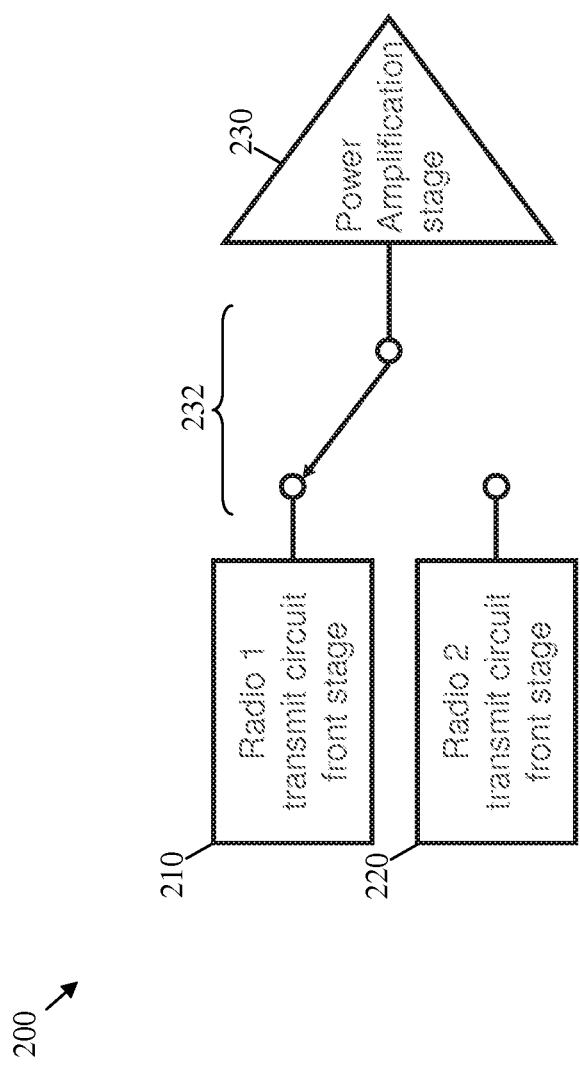
FIG. 2 is a schematic diagram of an embodiment of a radio transmitter switch mechanism.

FIG. 2 illustrates an embodiment of a radio transmitter switch mechanism 200, which may allow using the target radio transmitter during the source radio transmission gaps, in the case of using two radios in the mobile device. The radio transmitter switch mechanism 200 may be implemented using hardware in the mobile device, e.g., as part of the handover control function for the mobile device 110. The radio transmitter switch mechanism 200 may comprise a first radio transmitting circuit 210, a second radio transmitting circuit 220, a power amplifier 230, and a switch 232. The first radio transmitting circuit 210 may be part of the source radio at the mobile device and the second radio transmitting circuit 220 may be part of the target radio. As such, the first radio transmitting circuit 210 may be configured to communicate with a source network, e.g., the source network 120, and the second radio transmitting circuit 220 may be configured to communicate with a target network 130, e.g., the target network 130. The power amplifier 230 may be configured to amplify and forward the transmitted signals from the first radio transmitting circuit 210 or the second radio transmitting circuit 220. The switch 232 may be any switching device (e.g., electrical or electronic switch) configured to connect the power amplifier 230 to the first radio transmitting circuit 210 or to the second radio transmitting circuit 220 but not to both at the same time. Thus, controlling the switch 232 for the power amplifier 230 may determine which of the two radios may transmit data to the corresponding network at any instance of time.

Another transmitting opportunity for the target radio during handover may be to use the target radio transmitter when the source radio is receiving (and hence not transmitting) signals if sufficiently sharp signal filtering is used to eliminate or substantially reduce interference in the source radio receiver. The interference may be caused if the signals transmitted by the target radio are not filtered out efficiently from the signals received at the source radio. If sufficiently sharp signal filtering is lacking, then the target radio may not transmit at a frequency substantially close to that of the signals received in the source radio. However, the target radio transmitter may be used at a frequency substantially distant from that of the signals received in the source radio, e.g., even if sufficiently sharp signal filtering is lacking.

Figure 3:
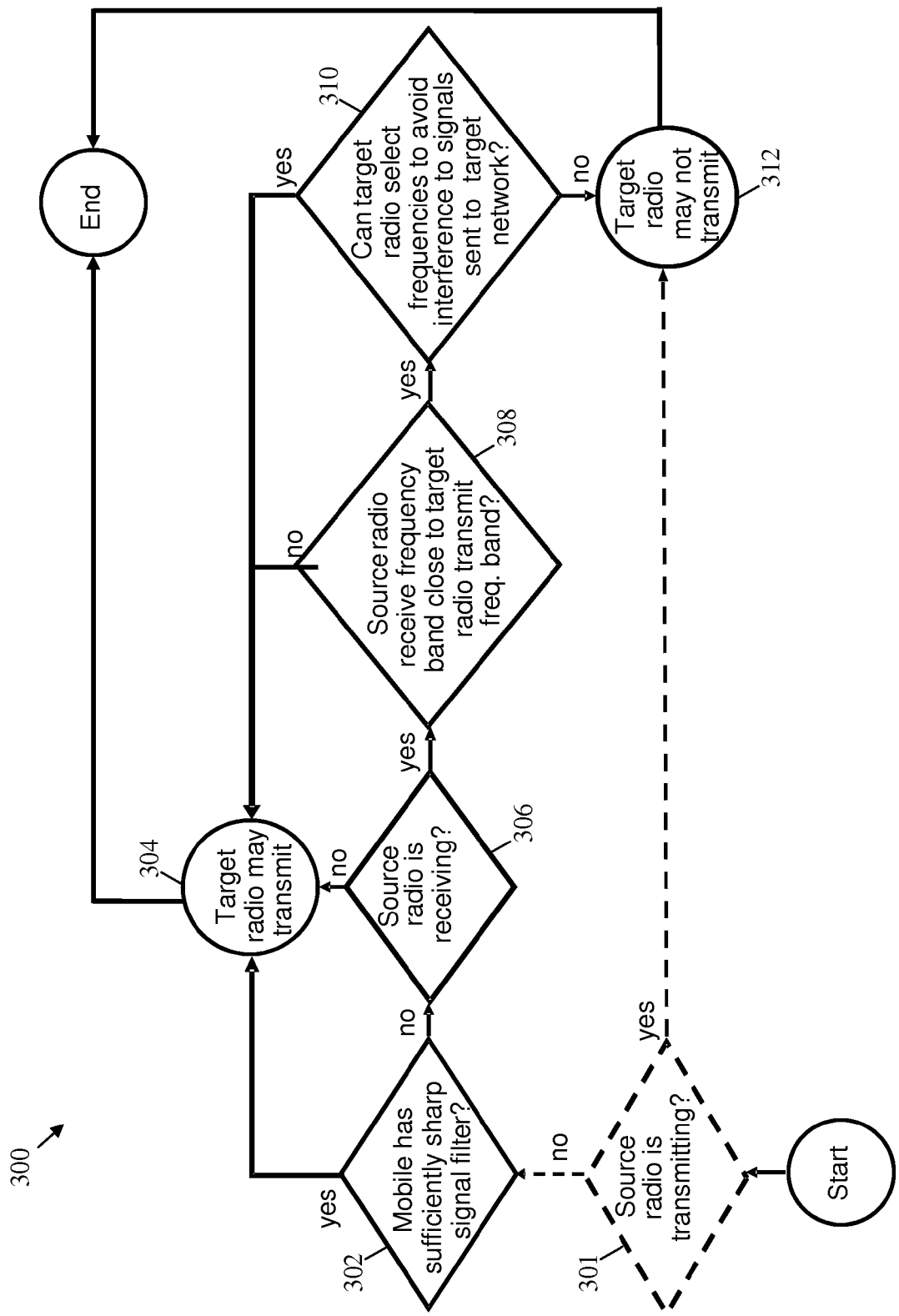
FIG. 3 is a flowchart of an embodiment of a target radio transmitting decision method.

FIG. 3 illustrates an embodiment of a target radio transmitting decision method 300, which may be used to exploit the transmitting opportunities above. The transmitting decision method 300 may be implemented using software and/or hardware in the mobile device, e.g., as part of the handover control function for the mobile device 110. The target radio transmitting decision method 300 may include the transmitting opportunities of using the target radio transmitter during transmission gaps in the source radio when the source radio is not receiving, the source radio is receiving using sufficiently sharp signal filtering, or the source radio is receiving and the target radio transmits at a substantially distant frequency from that of the source radio receiver.

The target radio transmitting decision method 300 may begin at block 301, where the method 300 may determine whether the source radio is transmitting. The mobile device may determine the status of the source radio during the handover by verifying whether the source radio is receiving signals, transmitting signals, or is idle. If the condition in block 301 is true, then the method 300 may proceed to block 312, where the target radio may not transmit any signals. Otherwise, the method 300 may proceed to block 302. Blocks 301 and 312 may be implemented using a switching mechanism that may be implemented via hardware, such as the radio transmitter switch mechanism 200. As such, if the condition in block 301 is true, then the switch 232 may connect the power amplifier 230 to the first radio transmitting circuit 210 (the source radio) to prevent the second radio transmitting circuit 220 (the target radio) from transmitting.

At block 302, the method 300 may determine whether the mobile device has a sufficiently sharp signal filter, e.g., to isolate the received signals in the source radio from the transmitted signals in the target radio and avoid substantial interference. If the condition in block 302 is true, then the method 300 may proceed to block 304. At block 304, the target radio may be allowed to transmit signals, which may correspond to the opportunity of using the target radio transmitter regardless of whether the source radio is receiving when sufficiently sharp signal filtering is used to isolate the received signals in the source radio from the transmitted signals in the target radio. Otherwise, the method 300 may proceed to block 306. At block 306, the method 300 may determine whether the source radio is receiving. If the source radio is receiving, then the method 300 may proceed to block 308. Otherwise, the method 300 may proceed to block 304, which may correspond to the opportunity of using the target radio transmitter during transmission gaps in the source radio.

At block 308, the method 300 may determine whether the source radio receiving frequency band is substantially close to the target radio transmitting frequency band. The distance (or difference) between the receiving and transmitting frequency bands may be compared to a minimum distance required to avoid or eliminate substantial interference in the receiver due to the transmitted signals. If the condition in block 308 is true (e.g., if the transmitting and receiving frequency bands are close enough to cause interference in the receiver), then the method 300 may proceed to block 310. Otherwise, the method 300 may proceed to block 304, which may correspond to the opportunity of using the target radio transmitter when the source radio is receiving and the target radio transmits at a substantially distant frequency from that of the source radio receiver. At block 310, the method 300 may determine whether the target radio can select frequencies to avoid interference to signals sent to the target network. For instance, the target radio may be capable of selecting a transmitting frequency band that is substantially distant than the receiving frequency band of the source radio. If the condition in block 310 is true, then the method 300 may proceed to block 304, where the target radio may transmit at an appropriate selected frequency. The target radio may inform the target network of the selected frequency. Alternatively, the target network may select the appropriate frequency and inform the target radio. This case may also correspond with the opportunity of using the target radio transmitter when the source radio is receiving and the target radio transmits at a substantially distant frequency from that of the source radio receiver. Otherwise, the method 300 may proceed to block 312 where the target radio does not transmit anything to the target network. The method 300 may end after implementing block 304 or block 312.

The receiving opportunities during the handover for using the target radio may include using the target radio receiver when the source radio is not transmitting (during transmission gaps in the source radio) to avoid interference in the target radio receiver from the signals transmitted by the source radio. The target radio receiver may be used even when the source radio is transmitting if sufficiently sharp signal filtering is used to eliminate or substantially reduce interference in the target radio receiver. The target radio receiver may also be used when the target radio is receiving at a frequency substantially distant from that of the source radio transmitter, e.g., even if sufficiently sharp signal filtering is lacking.

Figure 4:
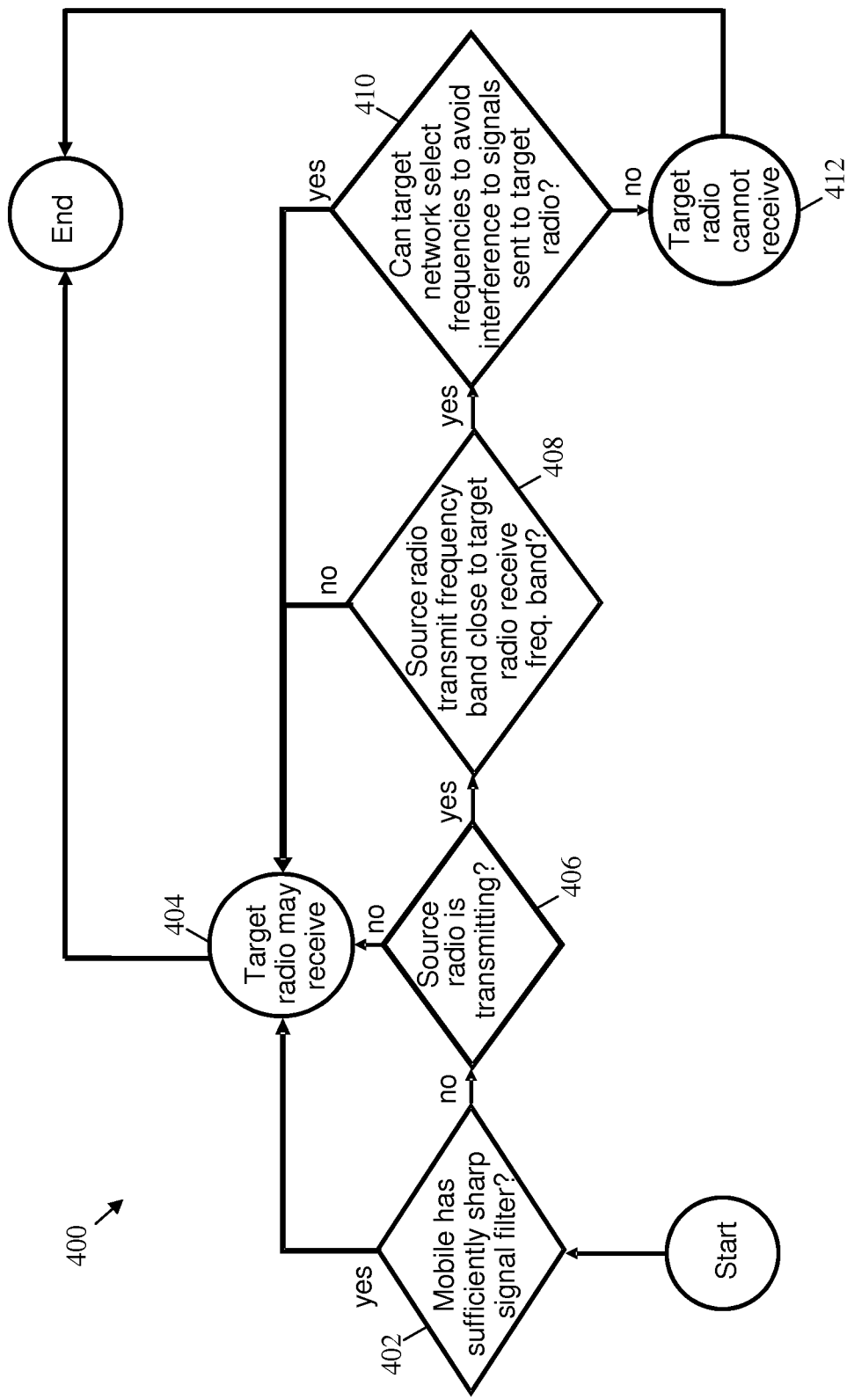
FIG. 4 is a flowchart of an embodiment of a target radio receiving decision method.

FIG. 4 illustrates an embodiment of a target radio receiving decision method 400, which may be used to exploit the receiving opportunities above. The receiving decision method 400 may be implemented using software and/or hardware in the mobile device, e.g., as part of the handover control function for the mobile device 110. The target radio receiving decision method 400 may include the receiving opportunities of using the target radio receiver when the source radio is not transmitting, the source radio is transmitting but the mobile device is using sufficiently sharp signal filtering, or the source radio is transmitting and the target radio receives at a substantially distant frequency from the source radio transmitter.

The target radio receiving decision method 400 may begin at block 402, where the method 400 may determine whether the mobile device has a sufficiently sharp signal filter, e.g., to isolate the received signals in the target radio from the transmitted signals in the source radio. If the condition in block 402 is true, then the method 400 may proceed to block 404. At block 404, the target radio may receive signals, which may correspond to the opportunity of using the target radio receiver anytime when sufficiently sharp signal filtering is used to isolate the received signals in the target radio. Otherwise, the method 400 may proceed to block 406. At block 406, the method 400 may determine whether the source radio is transmitting. If the source radio is transmitting, then the method 400 may proceed to block 408. Otherwise, the method 400 may proceed to block 404, which may correspond to the opportunity of using the target radio receiver when the source radio is not transmitting.

At block 408, the method 400 may determine whether the source radio transmitting frequency band is substantially close to the target radio receiving frequency band. If the condition in block 408 is true, then the method 400 may proceed to block 410. Otherwise, the method 400 may proceed to block 404, which may correspond to the opportunity of using the target radio receiver when the source radio is transmitting and the target radio receives at a substantially distant frequency from that of the source radio transmitter. At block 410, the method 400 may determine whether the target network can select frequencies to avoid interference to signals sent to the target radio. For instance, the target network may be capable of selecting a transmitting frequency band that is substantially distant than the transmitting frequency band of the source radio. If the condition in block 410 is true, then the method 400 may proceed to block 404, where the target radio may receive at an appropriate selected frequency. The target network may inform the target radio of the selected frequency. Alternatively, the target radio may select the appropriate frequency and inform the target network. This case may also correspond to the opportunity of using the target radio transmitter when the source radio is transmitting and the target radio receives at a substantially distant frequency from that of the source radio transmitter. Otherwise, the method 400 may proceed to block 412 where the target radio does not receive any transmissions from the target network. The method 400 may end after implementing block 404 or block 412.

Figure 5:
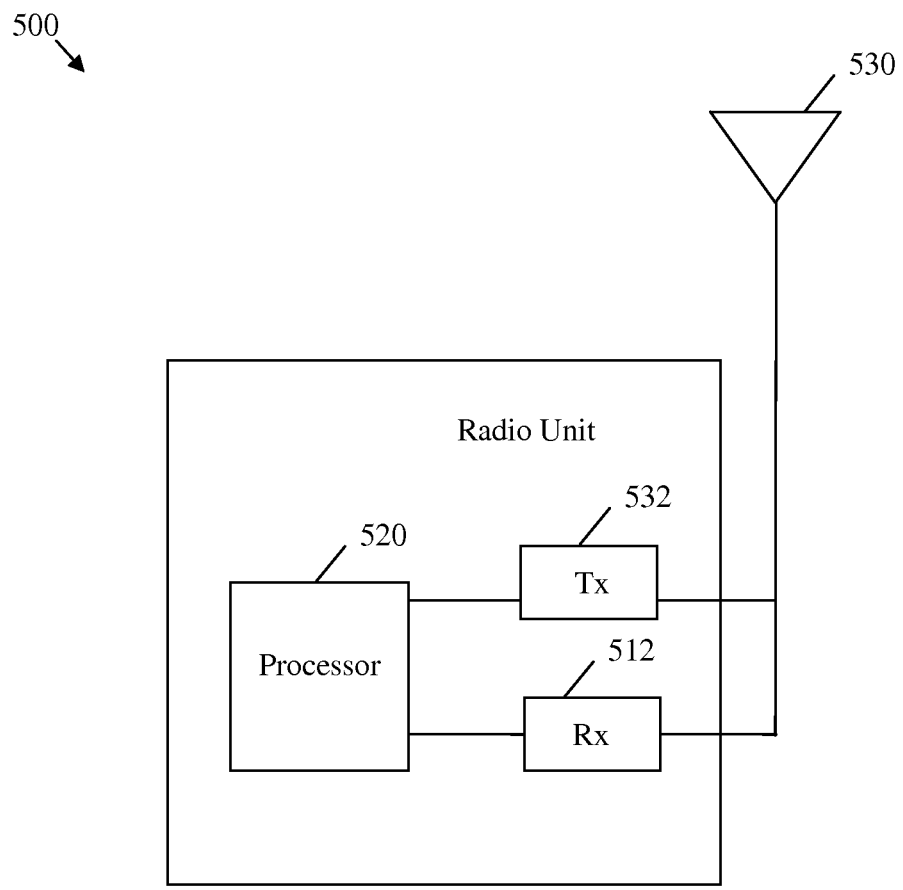
FIG. 5 is a schematic diagram of an embodiment of a radio unit.

FIG. 5 illustrates an embodiment of a radio unit 500, which may be any device that communicates data (e.g., packets) wirelessly with a network. For instance, the radio unit 500 may be located in a mobile device that exchanges or communicates data with networks or other mobile devices. The radio unit 500 may correspond to a target radio, a source radio, or both in the mobile device. The radio unit 500 may comprise a receiver 512 (Rx), which may be configured for receiving data, packets, or frames from other components. The radio unit 500 may comprise a logic unit or processor 520 coupled to the receiver 512, which is configured to process the data and determine to which components the data is to be sent. The logic unit or processor 520 may also be configured to implement or support the target radio transmitting decision method 300 and the target radio receiving decision method 400. The logic unit or processor 520 may be implemented using hardware, software, or both. The logic unit or processor 520 may also be coupled to and control a switching mechanism for the target and source radios (not shown), such as the radio transmitter switch mechanism 200. The radio unit 500 may also comprise a transmitter 532 (Tx) coupled to the logic unit or processor 520 and configured for transmitting data, packets, or frames to other components.

Figure 6:
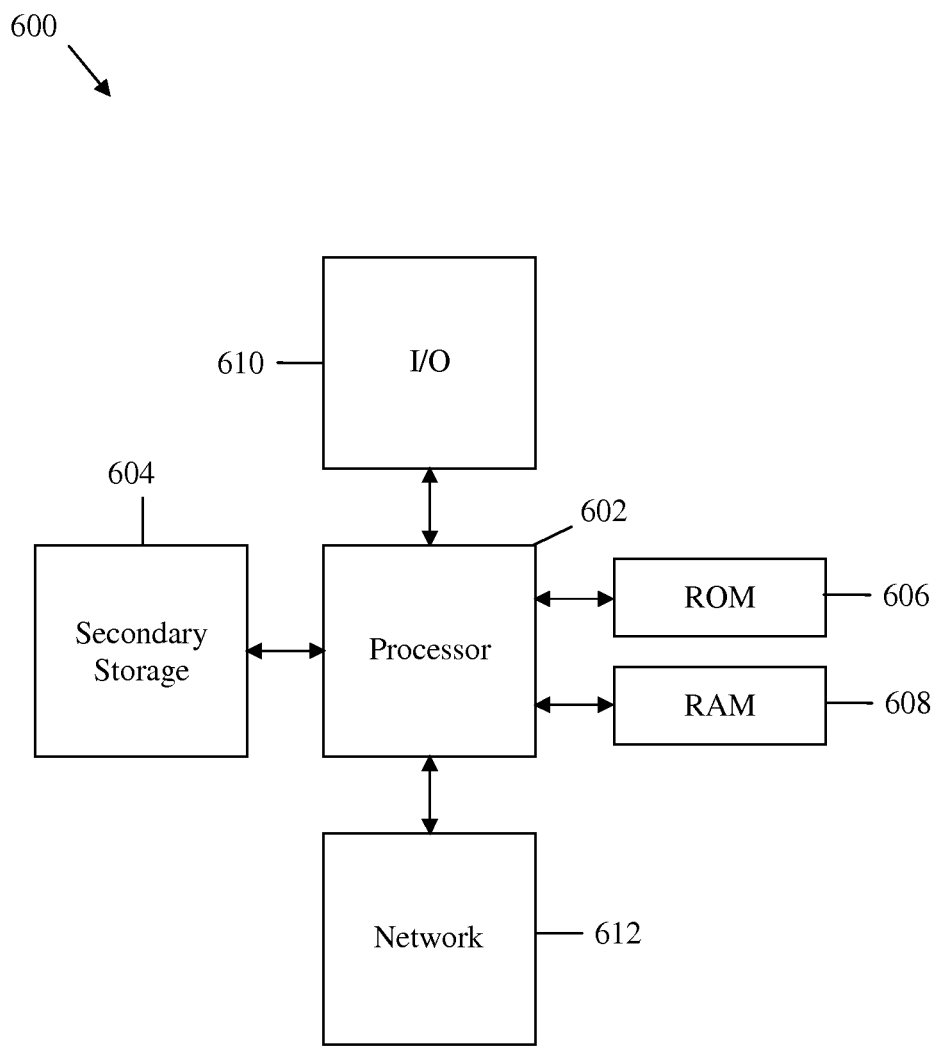
FIG. 6 is a schematic diagram of an embodiment of a general-purpose computer system.

The components and/or methods described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs) and/or Digital Signal Processors (DSPs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile device comprising a source radio and a target radio: at least one transmitter of the source radio used to wirelessly transmit signals to at least one network; and at least one receiver used to wirelessly receive signals from the at least one network, wherein the source radio and the target radios are configured to wirelessly communicate with a first network and a second network, respectively, wherein the target radio is configured to communicate with the second network during a handover procedure from the first network to the second network without disconnecting a link between the mobile device and the first network, wherein the mobile device is configured to communicate with the second network during transmitting and receiving opportunities in the handover procedure, and wherein the link between the mobile device and the first network remains at least partially active during the transmitting and receiving opportunities between the mobile device and the second network such that the mobile device having a single transmission power amplifier shared between the source and the target radio to accommodate required high switching speed may repeatedly alternate between communicating with the first network outside the transmitting and receiving opportunities and the second network during the transmitting and receiving opportunities; wherein the transmitting and receiving opportunities comprise communication gaps between the mobile device and the first network; and in the transmitting opportunities, a first receiver receives signals from a first network but the first transmitter does not transmit signals to the first network.

2. The mobile device of claim 1, wherein the at least one transmitter comprises a first transmitter configured to communicate with the first network and a second transmitter configured to communicate with the second network, and wherein the at least one receiver comprises a first receiver configured to communicate with the first network and a second receiver configured to communicate with the second network.

3. The mobile device of claim 2, wherein the at least one transmitter further comprises:
a power amplifier; and
a switch configured to couple the first transmitter or the second transmitter, but not both simultaneously, to the power amplifier, and wherein both the first transmitter and the second transmitter are configured to remain on regardless of whether the first transmitter or the second transmitter is coupled to the power amplifier.

4. The mobile device of claim 2, wherein the first transmitter and the first receiver have preemptive rights to use radio resources over the second transmitter and the second receiver.

5. The mobile device of claim 2, wherein the opportunities comprise a transmitting opportunity in which the first receiver receives signals from the first network but the first transmitter does not transmit signals to the first network, wherein communicating with the second network comprises using the second transmitter to transmit signals to the second network during the transmitting opportunity, and wherein the first receiver has a sufficiently sharp signal filter for filtering signals from the first network to avoid substantial interference in the first receiver from the transmitted signals of the second transmitter.

6. The mobile device of claim 2, wherein the opportunities comprise a communication gap between the mobile device and the first network in which the first transmitter does not transmit signals to the first network and the first receiver does not receive signals from the first network, and wherein both the second transmitter and the second receiver are configured to communicate with the second network during the communication gap.

7. The mobile device of claim 2, wherein the opportunities comprise a transmitting opportunity in which the first receiver receives signals from the first network but the first transmitter does not transmit signals to the first network, wherein communicating with the second network comprises using the second transmitter to transmit signals to the second network during the transmitting opportunity, and wherein a first frequency at which the first receiver receives signals from the first network is substantially distant from a second frequency at which the second transmitter transmits signals to the second network to avoid substantial interference in the first receiver from the transmitted signals of the second transmitter.

8. The mobile device of claim 7, further configured to select the second frequency before transmitting the signals from the second transmitter to the second network.

9. The mobile device of claim 2, wherein communicating with the second network comprises using the second receiver to receive signals from the second network during a receiving opportunity, and wherein the first transmitter does not transmit signals to the first network during the transmitting opportunity.

10. The mobile device of claim 2, wherein communicating with the second network comprises using the second receiver to receive signals from the second network, and wherein the second receiver has a sufficiently sharp signal filter for filtering signals from the second network to avoid substantial interference in the second receiver from transmitted signals of the first transmitter.

11. The mobile device of claim 2, wherein communicating with the second network comprises using the second receiver to receive signals from the second network at a first frequency, wherein the first transmitter transmits signals to the first network at a second frequency that is sufficiently distant from the first frequency to avoid substantial interference in the second receiver from the transmitted signals of the first transmitter.

12. The mobile device of claim 11, further configured to select the first frequency before receiving the signals at the second receiver from the second network.

13. The mobile device of claim 2, further comprising a processor configured to:
prevent the first transmitter and the first receiver from communication with the second network; and
prevent the second transmitter and the second receiver from communication with the first network.

14. A mobile device comprising: a source radio configured to wirelessly communicate with a source network; a target radio configured to wirelessly communicate with a target network; and a processor coupled to the source radio and the target radio, wherein the processor is configured to: detect one or more transmitting and receiving opportunities to wirelessly communicate with the target network during a handover of the mobile device from the source network to the target network, wherein the source radio stays at least partially on during periods of the transmitting and receiving opportunities to permit repeatedly alternating between wireless communication with the source network outside the one or more transmitting and receiving opportunities and the target network during the one or more transmitting and receiving opportunities utilizing a single transmission power amplifier of the mobile device shared between the source and the target radio to accommodate high required switching speed; and instruct the target radio to communicate with the target network during the periods of the transmitting and receiving opportunities; wherein the transmitting and receiving opportunities comprise communication gaps between the mobile device and the first network; and in the transmitting opportunities, a first receiver receives signals from a first network but the first transmitter does not transmit signals to the first network.

15. The mobile device of claim 14, wherein the detected opportunities comprise a transmitting gap in which the source radio receives signals from the source network but does not transmit signals to the source network, wherein communicating with the target network comprises transmitting signals to the target network using the target radio during the transmitting gap, and wherein the source radio comprises a signal filter for filtering signals from the source network to avoid substantial interference in the source radio from transmitted signals of the target radio.

16. The mobile device of claim 14, wherein the detected opportunities comprise a transmitting gap in which the source radio receives signals from the source network but does not transmit signals to the source network, wherein communicating with the target network comprises transmitting signals to the target network using the target radio during the transmitting gap, and wherein a first frequency at which the source radio receives signals from the source network is substantially distant from a second frequency at which the target radio transmits signals to the target network to avoid substantial interference in the source radio from the transmitted signals of the target radio.

17. The mobile device of claim 14, wherein the detected opportunities comprise a receiving gap in which the source radio does not transmit signals to the source network, wherein communicating with the target network comprises receiving signals from the target network using the target radio during the receiving gap.

18. The mobile device of claim 14, wherein the target radio comprises a signal filter for filtering signals from the target network to avoid substantial interference in the target radio from transmitted signals of the source radio, wherein communicating with the target network comprises receiving signals from the target network using the target radio regardless of whether the source radio is transmitting signals to the source network during the detected opportunities.

19. The mobile device of claim 14, wherein the detected opportunities comprise a receiving opportunity in which the source radio transmits signals to the source network at a first frequency, wherein communicating with the target network comprises receiving signals from the target network using the target radio at a second frequency during the receiving opportunity, wherein the second frequency is sufficiently distant from the first frequency to avoid substantial interference in the target radio from the transmitted signals of the source radio.

20. The mobile device of claim 14, wherein the source radio comprises a first transmitter coupled to a power amplifier, wherein the target radio comprises a second transmitter coupled to the power amplifier, wherein the mobile device further comprises a switch configured to connect the first transmitter or the second transmitter, but not both simultaneously, to the power amplifier, and wherein both the first transmitter and the second transmitter are configured to remain on regardless of whether the first transmitter or the second transmitter is connected to the power amplifier.

21. In a mobile node (MN) comprising a source radio and a target radio, a method for performing a handover of the MN from a source network to a target network, the method comprising: detecting one or more transmitting and receiving opportunities to wirelessly communicate with the target network during the handover, wherein the source radio stays at least partially on during periods of the transmitting and receiving opportunities to permit repeatedly alternating between wireless communication with the source network outside the one or more transmitting and receiving opportunities and the target network during the one or more transmitting and receiving opportunities utilizing a single transmission power amplifier of the mobile device shared between the source and the target radio to accommodate required high switching speed; and communicating with the target network using the target radio during the periods of the transmitting and receiving opportunities; wherein the transmitting and receiving opportunities comprise communication gaps between the mobile device and the first network; and in the transmitting opportunities, a first receiver receives signals from a first network but the first transmitter does not transmit signals to the first network.

22. The method of claim 21, further comprising:
determining that the source radio is transmitting signals to the source network at a given time during the handover; and
prevent the target radio from transmitting signals to the target network at the given time.

23. The method of claim 21, wherein the detected opportunities comprise a receiving opportunity in which the source radio receives signals from the source network, and wherein communicating with the target network comprises transmitting signals to the target network during the transmitting opportunity in a manner that does not cause interference to a receiver in the source radio.

24. The method of claim 21, further comprising:
exchanging user data with the source network over a link between the source radio and the source network prior to completion of the handover; and
exchanging user data with the target network after the completion of the handover.

25. In a mobile device comprising a source radio and a target radio, a method for performing a handover of the mobile device from a source network to a target network, the method comprising: determining one or more windows of transmitting and receiving opportunities during the handover to wirelessly communicate with the target network; wirelessly communicating with the source network using the source radio during the windows of transmitting and receiving opportunities; communicating with the target network using the target radio during the windows of transmitting and receiving opportunities in a manner that prioritizes communications with the source network but does not cause interference to the source radio, wherein the source radio stays at least partially on during periods of the opportunities to permit repeatedly alternating between communication with the source network outside the one or more transmitting and receiving opportunities and the target network during the one or more transmitting and receiving opportunities utilizing a single transmission power amplifier of the mobile device shared between the source and the target radio to accommodate required high switching speed; and the source radio and the target radio remain on during communications; wherein the transmitting and receiving opportunities comprise communication gaps between the mobile device and the first network; and in the transmitting opportunities, a first receiver receives signals from a first network but the first transmitter does not transmit signals to the first network.

26. The method of claim 25, further comprising exchanging data with the target network after completion of the handover, wherein data is carried over a link between the source radio and the source network prior to the completion of the handover, and wherein no data is carried over a link between the target radio and the target network prior to the completion of the handover.

27. The method of claim 26, wherein the windows of opportunities comprise a receiving opportunity in which the source radio is transmitting signals to the source network in a first frequency band, wherein communicating with the target radio comprises receiving signals from the target network in a second frequency band during the receiving opportunity, wherein the second frequency band is different from the first frequency band to avoid substantial interference in the target radio from the transmitted signals of the source radio, and wherein the target radio does not transmit signals during the receiving opportunity.

* * * * *